Sept. 3, 1935.  G. M. CONWAY  2,013,200
AUTOMATIC WINDOW WIPER
Filed Dec. 9, 1930  5 Sheets-Sheet 1
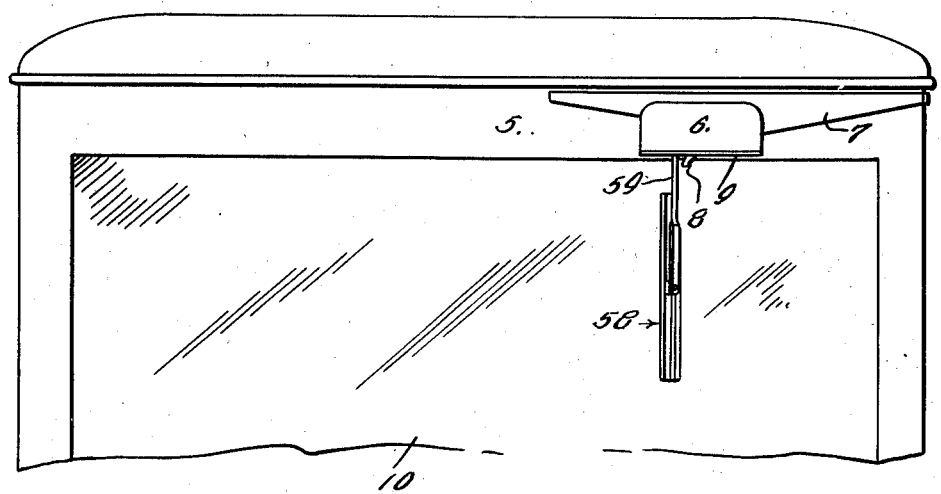
Fig. 1.
Fig. 13.
Fig. 2.
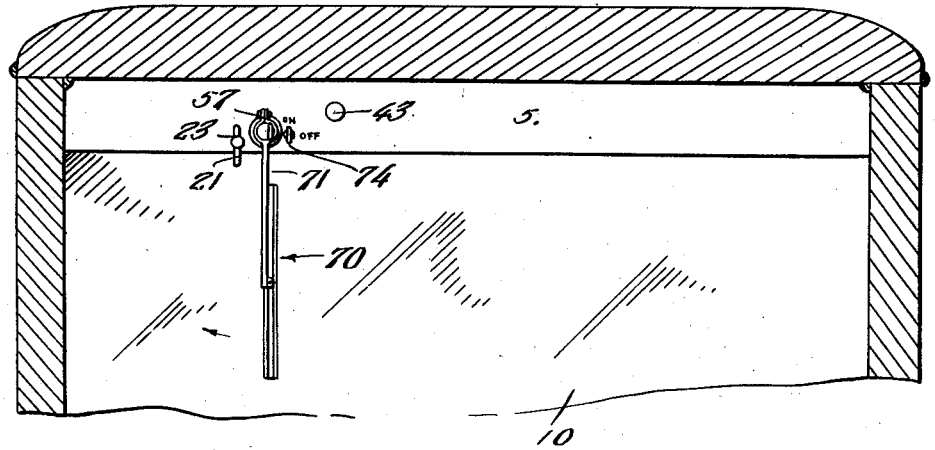
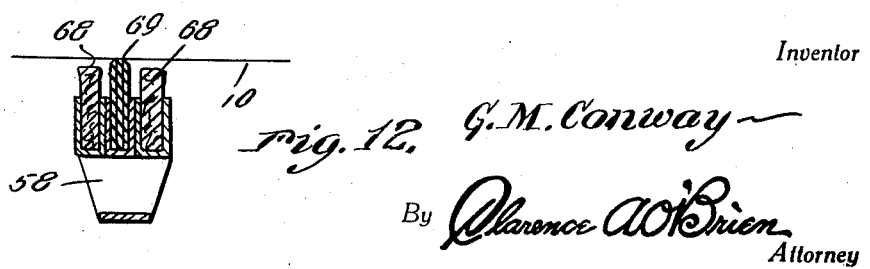
Fig. 12.
Inventor
G. M. Conway
By Clarence A. O'Brien
Attorney Sept. 3, 1935.  G. M. CONWAY  2,013,200
AUTOMATIC WINDOW WIPER
Filed Dec. 9, 1930  5 Sheets-Sheet 2

Inventor
G. M. Conway

By Clarence A. O'Brien
Attorney

Sept. 3, 1935.    G. M. CONWAY    2,013,200
AUTOMATIC WINDOW WIPER
Filed Dec. 9, 1930    5 Sheets-Sheet 3

Inventor
G. M. Conway
By Clarence A. O'Brien
Attorney

Sept. 3, 1935.  G. M. CONWAY  2,013,200
AUTOMATIC WINDOW WIPER
Filed Dec. 9, 1930  5 Sheets-Sheet 4

Inventor

G. M. Conway

By Clarence A. O'Brien
Attorney

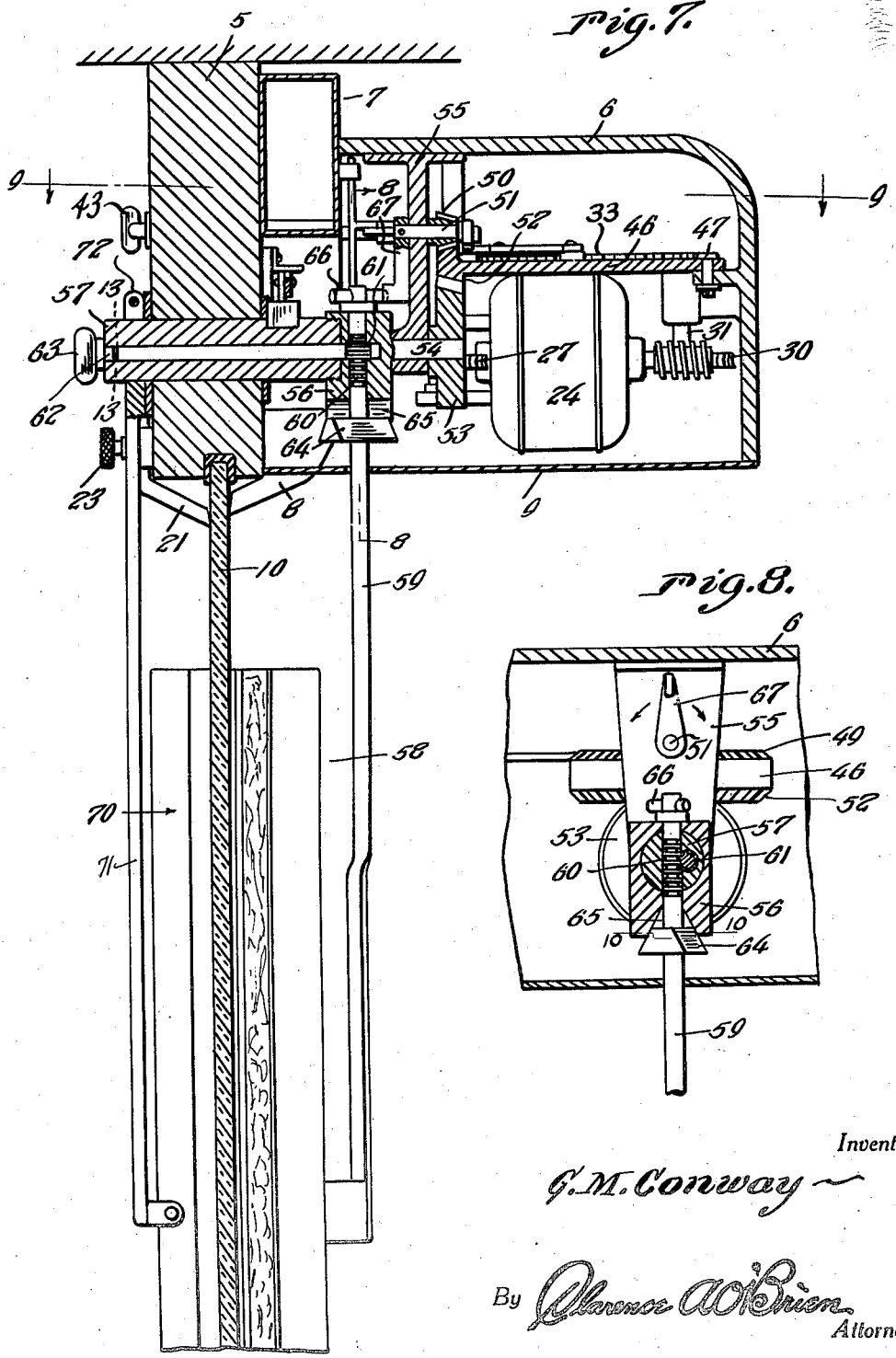

Patented Sept. 3, 1935

2,013,200

UNITED STATES PATENT OFFICE 2,013,200

AUTOMATIC WINDOW WIPER

George M. Conway, Kansas City, Mo.

Application December 9, 1930, Serial No. 501,150

3 Claims. (Cl. 15—255)

This invention appertains to new and useful improvements in window wipers, and more particularly to a novel window wiper of the automatic type.

The principal object of the invention is to provide a combination window wiper and anti-freeze fluid applicator, wherein both function automatically.

Various other important objects and advantages of the invention will become more apparent to the reader as the invention is better understood from the following specification and claims.

In the drawings:—

Figure 1 represents a front elevational view, fragmentarily showing the windshield of an automobile with the novel window wiper mounted in association therewith.

Fig. 2 represents a vertical transverse sectional view through an automobile looking toward the inner side of the windshield to disclose the control of the invention.

Fig. 7 represents a vertical sectional view though the invention.

Fig. 8 represents a fragmentary vertical sectional view taken substantially on the line 8—8 of Fig. 7.

Fig. 12 is another cross sectional view of the wiper in wiping engagement with the windshield.

Fig. 13 represents a cross sectional view of one of the control members.

Figures 3, 11:
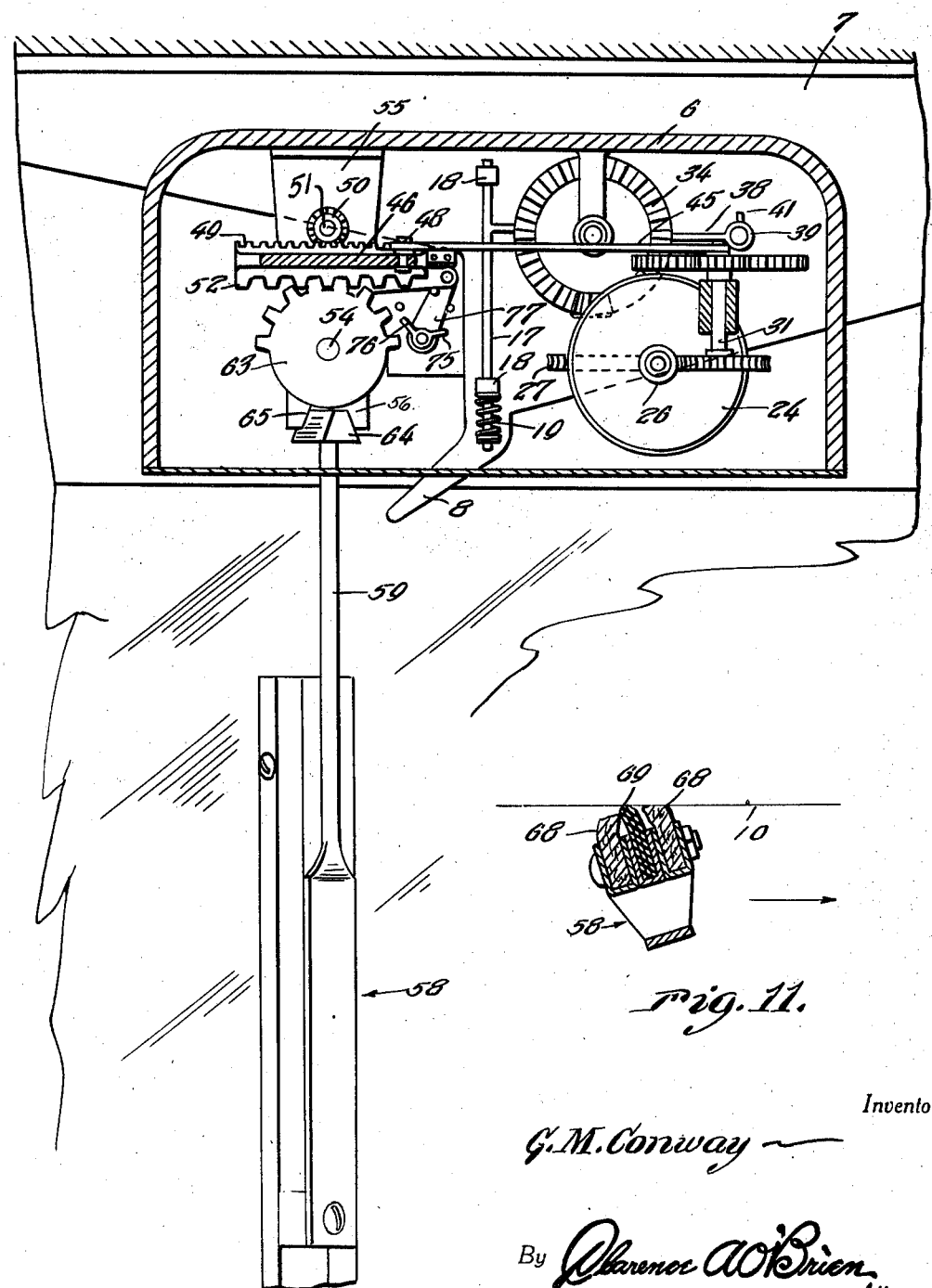
Fig. 3 is a vertical sectional view taken substantially on the line 3—3 of Fig. 4.
Fig. 11 represents a cross sectional view of the outer wiper.

Referring to the drawings wherein like numerals designate like parts, it can be seen that numeral 5 represents the frame of the usual windshield construction, a housing 6 being secured to the outer side of the windshield frame, and an anti-freeze fluid containing receptacle 7 is mounted in a position between the housing 6 and the outer side of the frame 5.

This receptacle 7 is substantially triangular in shape, the same being provided with a depending spout 8 disposed through an opening in the bottom plate 9 of the housing 6 to terminate at its discharge end adjacent the windshield pane 10.

Figure 4:
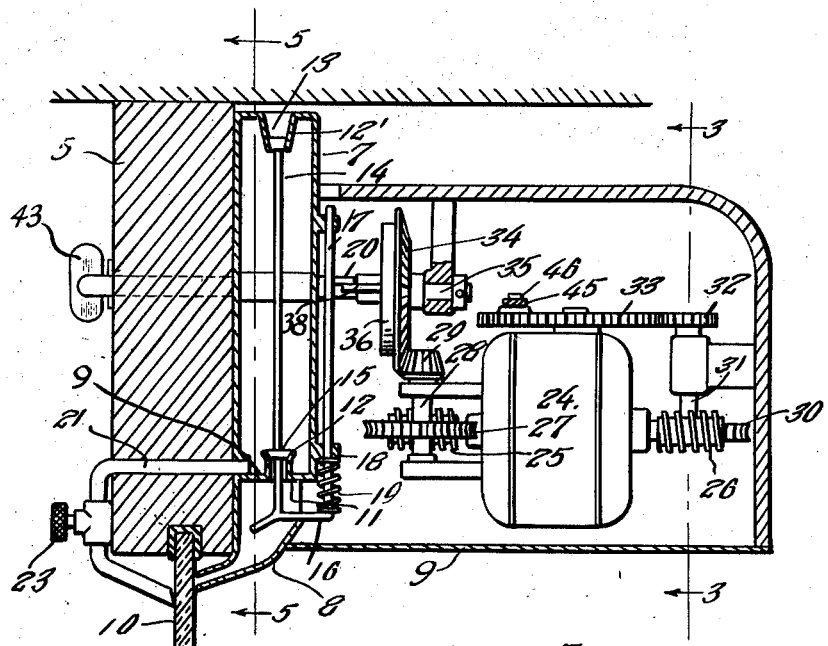
Fig. 4 represents a vertical sectional view through the invention and associated structure of an automobile.

As is shown in Fig. 4, the interior of the spout 8 is separated from the receptacle proper (interiorly speaking) by a partition 11 which has a seat structure 12 provided thereon. A seat structure 12' is provided at the top of the receptacle 7 and is inwardly disposed and tapered to receive the tapered valve element 13, carried by the upper end of the stem 14.

A second valve 15 is provided on the stem 14 adjacent the lower end thereof, which will seat on the structure 12 simultaneously with the seating of the valve 13 on the seat 12'. The lower end of the stem 14 has a laterally disposed arm 16 which is connected to the upwardly disposed rod 17 on the outer side of the receptacle 7. This rod 17 is slidably disposed through guides 18 and a spring 19 is interposed between the lower guide 18 and the arm 16 for normally maintaining the valves 13 and 15 seated.

A lug 20 is provided on the rod 17 adjacent the upper end thereof. A conduit 21 extends from the lower portion of the receptacle 7 immediately above the partition 11, through the windshield frame 5, down the inner side of the frame to terminate at its discharge end in juxtaposition to the windshield pane 10.

A valve 23 is provided in the conduit 21 for shutting the same off when desired.

A motor 24 is mounted within the housing 6, the armature shaft of which is provided with a worm 25 at one end and a worm 26 at its opposite end. The worm 25 drives the gear 27 on the shaft 28, the latter shaft having a small bevel gear 29 keyed thereto.

The worm 26 drives the gear wheel 30 on the shaft 31 which also carries the pinion 32, the latter being in mesh with the relatively large gear 33.

Figure 6:
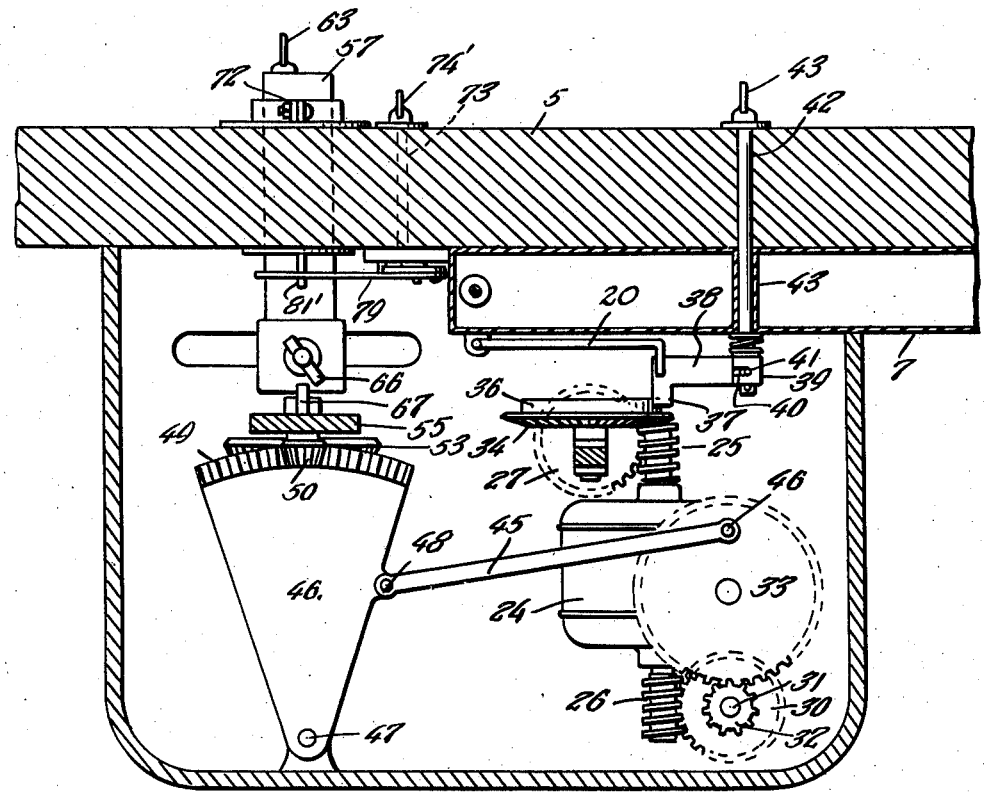
Fig. 6 represents a horizontal sectional view through the invention.
Figure 9:
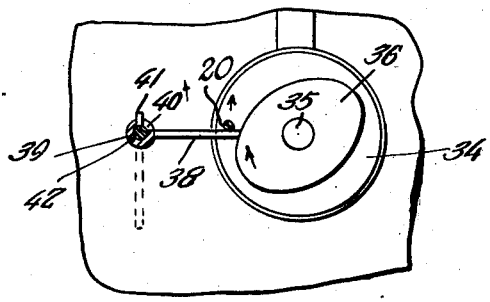
Fig. 9 is a fragmentary sectional view showing a detail.
Figure 10:
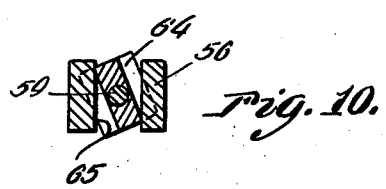
Fig. 10 represents a detail horizontal sectional view on line 10—10 of Figure 8.

The aforementioned bevel gear 29 meshes with the relatively large bevel gear 34 on the shaft 35 and as is clearly shown in Figs. 6 and 9, the gear 34 has a cam 36 secured to one side thereof and against this cam rides the foot 37 on the leg 38. This leg 38 has a collar 39 at its inner end provided with a slot 40 through which the pin 41 protrudes.

This pin 41 is on the shaft 42 which extends through the tubing 43 disposed through the receptacle 7 and extends through the windshield frame 5 to terminate at the inner end thereof in a control head 43.

The aforementioned lug 20 on the upper end of the rod 17 rests upon the leg 38 in the manner shown in Fig. 9. Thus, when the gear 34 is rotating, the cam 36 intermittently raises the leg 38 which in turn imparts motion to the lug 20, lifting the rod 17 and causing the air valve 13 and fluid by-pass valve 15 to open admitting several drops of the anti-freeze fluid into the spout 8, from where it flows to the windshield pane 10.

By rotating the shaft 42, by its handle 43, the leg 38 may be moved to the dotted line position shown in Figure 9 and in this position of the parts, the cam 36 will not actuate the valve of the receptacle 7 so that the wiper may be operated without the use of liquid.

The aforementioned gear 33 has the rod 45 pivotally and eccentrically secured thereto as at 46. A triangular shaped rack 46 is pivotally secured to a support as at 47. The opposite end of the rod 45 connects to the rack 46 as at 48. The rack teeth 49 mesh with the pinion 50 on the shaft 51, while the rack teeth 52 on the bottom side of the rack 46, mesh with the mutilated gear 53 on the shaft 54, a bracket 55 supporting both the shaft 51 and the shaft 54.

The shaft 54 is secured to the block 56 which has a threaded recess in one side thereof to receive the outer end of the hollow rotor 57, journaled through the windshield frame 5. The novel windshield wiper and fluid applicator is generally referred to by numeral 58 and is provided with a stem 59 which extends upwardly through the block 56 and is provided at its upper end portion with a rack 60 which meshes with the gear 61 on the shaft 62 which extends through the rotor 57 this shaft being equipped at its inner end with a control member 63.

Obviously, by rotating the shaft 62, the stem 59 can be fed upwardly, so that the transversely disposed block 64 which is substantially triangular in cross section, can be elevated into the V-shaped notch 65 at the lower end of the block 56.

Obviously, the further into the notch the block 64 is disposed, the less swing will be permitted on the stem 59 when the wiper is being employed for applying the anti-freeze fluid to the windshield pane. A cross pin 66 is provided at the upper end of the stem 59, and as is clearly shown in both Fig. 7 and Fig. 6, the arm 67 on the shaft 51 will alternately engage the opposite sides of one end of the pin 66 during the oscillation of the shaft 51.

Obviously, when the stem 59 is elevated to its highest extent, the pin 66, will be at an elevation out of the path of the arm 67, thus permitting the wiper 68 to be employed solely as a wiper in the position shown in Fig. 12. Of course, when the stem 59 is in a low position as shown in Fig. 7, the same will swing at each extreme position during the oscillation of the wiper 58 so as to cause either one of the felt strips 68 to wipe against the windshield pane 10, the strips 68 being of felt or some other absorbing material, so as to act as applicators of the deposited anti-freeze fluid to the windshield pane.

Interposed between the absorbing strips 68—68 is the squeegee 69.

A second wiper 70 of the conventional construction is provided with the arm 71, which is equipped at its upper end with a clamp structure 72 for engagement against the inner end of the rotor 57, so that the inner wiper will operate simultaneously with the outer wiper.

In order to stop the wiper at a definite position out of the ordinary line of vision of the driver, a shaft 73 is journaled through the windshield frame 5, the same being equipped at its inner end with a control element 74' and at its outer end with a collar 74 having a pair of angularly shaped fingers 75 and 76 projecting therefrom.

This shaft 73 also carries an arm 77 loose thereon. The upper end of this arm 77 is pivotally connected as at 79 to the claw bar 79 having the head 80 on its free end engageable with the lug 81' on the rotor 57. Pins 81—81 serve as stops for the arm 77 and numeral 82 represents one contact, while the shaft 73 serves as the opposite terminal of the motor circuit, (not shown). During operation, the head 80 is disengaged from the lug 81' while the arm 77 and bar 79 serves as a connector between the shaft 73 and the contact 82.

Figure 5:
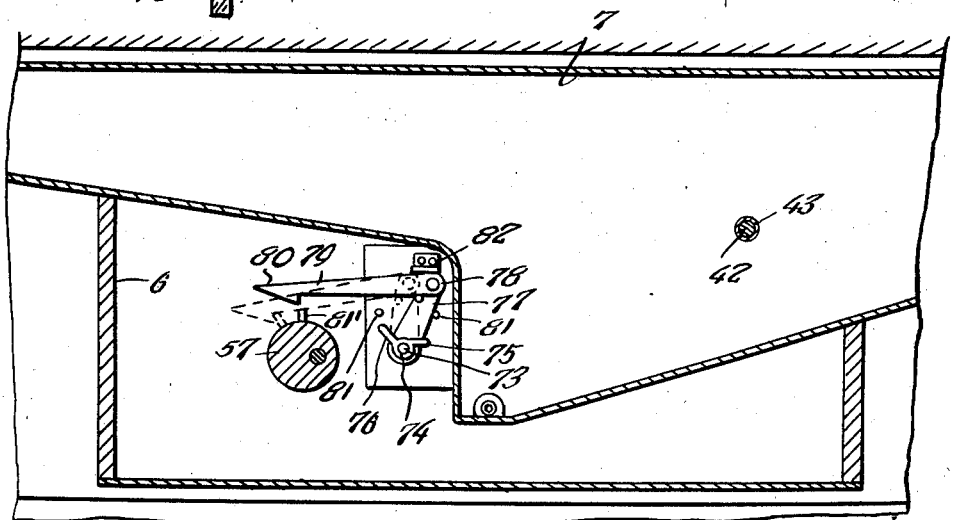
Fig. 5 represents a vertical sectional view, taken substantially on the line 5—5 of Fig. 4.

When it is desired that the operation of the device cease, the shaft 73 is rotated so as to actuate the finger 75. This finger will move the arm 77 over to the dotted line position shown in Fig. 5. This movement however does not entirely separate the arm 79 from the contact 82 so that the motor is still moving. With the parts in this position the lug 81' will engage against the head 80, so that the bar 79 is moved to entirely disengage from the contact 82 and thus the motor will be stopped with the parts in a predetermined position, with the wiper elements located at one limit of their movement so that they will be out of the line of vision of the driver, and the parts will always come to rest with the wiper element in this position. When it is desired to start the wiping operation the shaft 73 is turned in an opposite direction to cause the finger 76 to move the arm 77 to the full line position shown in Figure 5 so that the circuit is again closed and the head 80 on the arm 79 is moved out of engagement with the pin 81'.

While the foregoing specification sets forth the invention in definite terms, it is to be understood that numerous changes in the shape, size and materials may be restored to without departing from the spirit and scope of the invention as claimed hereinafter.

Having thus described my invention, what I claim as new is:—

1. A wiper device of the class described comprising a motor driven oscillatory member, an arm attached to said member, a wiper element carried by the arm, and manually operated means for adjusting the arm vertically, motor driven means for rocking the arm about its longitudinal axis at each end of the oscillatory movement of the member, when the arm has been adjusted vertically to a position in the same plane with said motor driven means, and the wiping element including a distributing strip which is moved into engagement with the member to be wiped by the rocking movement of the arm whereby a liquid placed on said member to be wiped will be distributed on said member to be wiped by said strip.

2. A windshield wiper of the class described comprising a rotary member supported in a part of the windshield frame, a block connected to the outer end of said member, an arm having its upper end supported for vertical movement in the block, a wiping element at the lower end of the arm, a gear connected with the block, a rack meshing with the gear, motor driven means for oscillating the rack, a second gear meshing with the rack, an arm connected with the second gear, a projection on the wiper arm engaged by the last mentioned arm for rocking the wiper arm about its longitudinal axis and manually operated means for adjusting the wiper arm vertically to move the projection thereon into and out of engagement with its operating arm.

3. A windshield wiper of the class described comprising a member rotatably arranged in the upper part of the windshield frame, a block connected to the outer end of said member, a shaft connected with the block, a gear on the shaft, a rack meshing with the gear, motor driven means for oscillating the rack, an arm having its upper end supported for sliding movement in the block, a wiper element connected with the lower end of the arm and including a wiper strip and a distributing strip on each side of the wiper strip, manually operated means including a shaft passing through the rotary member for adjusting the arm vertically in the block, a projection on the upper end of the arm, an L-shaped arm for engaging the projection when the wiper arm is in a position in the same plane with said L-shaped arm, said projection being disengaged from the L-shaped arm when the wiper arm is in another position, a shaft carrying the L-shaped arm, a gear thereon, a second set of teeth on the rack engaging said last mentioned gear, a reservoir containing anti-freeze solution, a nozzle leading from the reservoir to a point adjacent the windshield, a valve in the nozzle, means operated by the motor driven means for opening the valve at predetermined times and manually operated means for moving the parts to a position where the valve will not be opened by such means.

GEORGE M. CONWAY.